(12) United States Patent
Suzuki

(10) Patent No.: US 7,885,481 B2
(45) Date of Patent: Feb. 8, 2011

(54) AUTHENTICITY PROVING OPTICAL STRUCTURE, AUTHENTICATING PROOF RECORDING MEDIUM AND AUTHENTICITY CERTIFYING METHOD

(75) Inventor: Shin-Ichiro Suzuki, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 933 days.

(21) Appl. No.: 10/491,416

(22) PCT Filed: Oct. 9, 2002

(86) PCT No.: PCT/JP02/10492

§ 371 (c)(1),
(2), (4) Date: Apr. 1, 2004

(87) PCT Pub. No.: WO03/034156

PCT Pub. Date: Apr. 24, 2003

(65) Prior Publication Data

US 2004/0207891 A1 Oct. 21, 2004

(30) Foreign Application Priority Data

Oct. 11, 2001 (JP) .............................. 2001-313820

(51) Int. Cl.
*G03H 1/00* (2006.01)
(52) U.S. Cl. ........................................................ 382/280
(58) Field of Classification Search .................. 382/280
See application file for complete search history.

(56) References Cited

U.S. PATENT DOCUMENTS

| 4,071,291 | A | * | 1/1978 | Suzuki et al. .................. 359/24 |
| 5,029,961 | A | * | 7/1991 | Suzuki et al. .................. 385/50 |
| 5,404,410 | A | * | 4/1995 | Tojo et al. ..................... 382/144 |
| 6,665,145 | B2 | * | 12/2003 | Wada .......................... 360/133 |
| 6,831,997 | B2 | * | 12/2004 | Kamon ....................... 382/144 |
| 2001/0021015 | A1 | * | 9/2001 | Morioka et al. ........... 356/237.5 |
| 2002/0001109 | A1 | * | 1/2002 | Hamano et al. ................. 359/9 |
| 2003/0142379 | A1 | * | 7/2003 | Takemori et al. .............. 359/35 |
| 2004/0179253 | A1 | * | 9/2004 | Hamano et al. ................. 359/9 |

FOREIGN PATENT DOCUMENTS

| JP | A-2-165987 | 6/1990 |
| JP | A-6-202539 | 7/1994 |

(Continued)

OTHER PUBLICATIONS

Office Action issued in Japanese Patent Application No. 2008-107155 mailed Nov. 5, 2010 (w/English Translation).

*Primary Examiner*—Samir A. Ahmed
*Assistant Examiner*—John W Lee
(74) *Attorney, Agent, or Firm*—Oliff & Berridge, PLC

(57) ABSTRACT

An optical structure 3 having a plurality of minute optical unit areas 4 is formed on a base 2. Each of the minute optical unit areas 4 has a plurality of minute areas A and B storing depth information representing multiple-valued phase information about a Fourier transformation image obtained through the Fourier transformation of an original image. In another embodiment of the present invention, the two adjacent minute optical unit areas 4 have a plurality of minute areas A and B storing depth information representing multiple-valued phase information about Fourier transformation images obtained through the Fourier transformation of different original images, respectively.

6 Claims, 3 Drawing Sheets

FOREIGN PATENT DOCUMENTS

| | | |
|---|---|---|
| JP | 06-337622 | 12/1994 |
| JP | A-10-142806 | 5/1998 |
| JP | 10-282870 | 10/1998 |
| JP | 11-272152 | 10/1999 |
| JP | 2000-003124 | 1/2000 |
| JP | 2001-100623 | 4/2001 |
| WO | WO 95/27627 A | 10/1995 |

* cited by examiner

AUTHENTICITY PROVING OPTICAL STRUCTURE, AUTHENTICATING PROOF RECORDING MEDIUM AND AUTHENTICITY CERTIFYING METHOD

TECHNICAL FIELD

The present invention relates to an authenticity-proving optical structure, and an authenticating proof recording medium provided with the authenticity-proving optical structure.

The present invention relates also to an authenticity-certifying method using the authenticity-proving optical structure or the authenticity-proving optical structure included in the authenticating proof recording medium.

BACKGROUND ART

Most transaction cards, such as bank cards issued by financial organizations or credit cards issued by credit companies, are provided with a diffraction grating or a hologram to prove the authenticity of those cards.

Expensive goods whose imitations often appear on the market, such as brand-name wrist watches, and cases or packaging for those goods are often provided with a diffraction grating or a hologram to prove the authenticity of the commodities.

A diffraction grating or a hologram (hereinafter referred to as "hologram or the like") is applied to articles in various fields even outside the fields mentioned above because the hologram or the like is difficult to make or reproduce. The hologram or the like has become prevalent for its merits, such as its conspicuous interference colors, its excellent design, and the feature that the structure is destroyed if the hologram or the like is removed, making the transference of the hologram impossible.

Although the hologram or the like is difficult to reproduce, specialists in the field of hologram or the like know how to reproduce the hologram or the like. Since precision techniques are applied to counterfeit the hologram or the like, a counterfeit hologram or the like closely resembling an authentic hologram or the like can be formed. Therefore, it is very difficult to discriminate between a counterfeit hologram or the like and an authentic hologram or the like.

Various trials have been made to enhance the safety of the hologram or the like against counterfeiting.

An optical authenticity-proving image data recording medium recording CGHs (computer-generated holograms) representing first and second hologram patterns is disclosed in JP-A 2000-3124. The optical authenticity-proving image data recording medium projects transmitted diffracted light or reflected diffracted light forming a predetermined image proving the authenticity of goods when irradiated with monochromatic light. According to JP-A 2000-3124, a decision whether or not the goods are authentic can be easily made from the result of irradiation of the optical authenticity-proving image data recording medium with monochromatic light having a predetermined wavelength, i.e., whether or not the predetermined image is projected.

Since an area in which the hologram is formed by the prior art is large or the position of the area can be clearly known, the hologram can be easily detected and located, and the hologram can be easily analyzed. Thus, the safety of the prior art against counterfeiting is not sufficiently reliable.

DISCLOSURE OF THE INVENTION

It is an object of the present invention to provide an authenticity-proving optical structure capable of reproducing visually recognizable information when irradiated with coherent light and of being concealed or being made indistinct, an authenticating proof recording medium and an authenticity-certifying method.

According to the present invention, an authenticity proving optical structure comprises a plurality of minute optical unit areas, wherein each of the minute optical unit areas has a plurality of minute areas storing depth information representing multiple-valued phase information about a Fourier transformation image obtained through the Fourier transformation of an original image.

According to the present invention, the authenticity proving optical structure is characterized in that each of the minute optical unit areas has a plurality of minute areas storing depth information representing multiple-valued phase information about Fourier transformation images obtained through the Fourier transformation of different original images.

According to the present invention, the authenticity proving optical structure is characterized in that the two adjacent minute optical unit areas have a plurality of minute areas storing depth information representing multiple-valued phase information about Fourier transformation images obtained through the Fourier transformation of different original images, respectively.

According to the present invention, the authenticity proving optical structure is characterized in that the minute optical unit areas have a length of 0.3 mm or below.

According to the present invention, the authenticity proving optical structure is characterized in that the minute optical unit areas have a polygonal shape.

According to the present invention, the authenticity proving optical structure is characterized in that the minute optical unit areas have the shape of a letter, a numeral, a figure or a symbol.

According to the present invention, an authenticating proof recording medium comprises a base, and an optical structure formed on the base, wherein the optical structure has a plurality of minute optical unit areas, and each of the minute optical unit areas has a plurality of minute areas storing depth information representing multiple-valued phase information about a Fourier transformation image obtained through the Fourier transformation of an original image.

According to the present invention, an authenticity certifying method using an authenticity proving optical structure having a plurality of minute optical unit areas, each of the minute optical unit areas having a plurality of minute areas having depths representing phase information about a Fourier transformation image obtained through the Fourier transformation of an original image, comprises the steps of: forming a reference image; irradiating the authenticity proving optical structure with coherent light; and deciding whether or not an image reproduced from the authenticity proving optical structure is identical with the reference image.

BEST MODE FOR CARRYING OUT THE INVENTION

Figure 1:
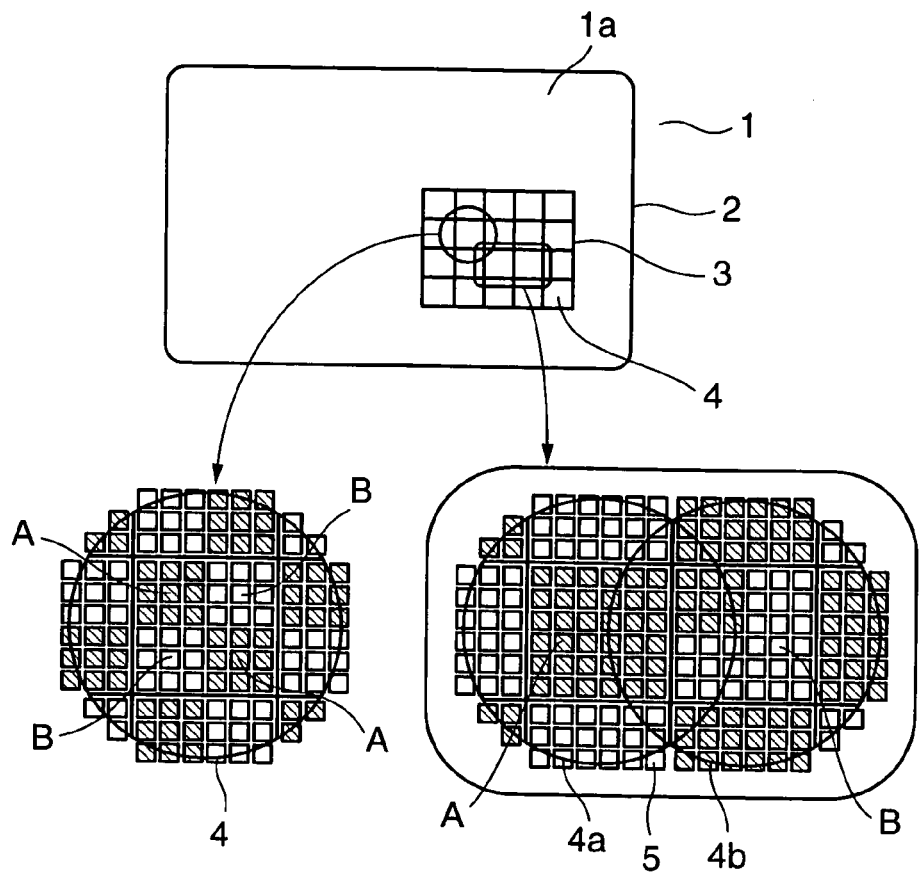
FIG. 1 is a plan view of an authenticating proof recording medium in a preferred embodiment according to the present invention.

FIG. 1 is a plan view of an authenticating proof recording medium in a preferred embodiment according to the present invention as applied to a card, such as a bank card or a credit card.

Referring to FIG. 1, an authenticating proof recording medium 1 has a base 2, and an authenticity proving optical structure 3 provided on the base 2. The authenticity proving optical structure 3 may be embedded in the base such that the upper surface of the authenticity proving optical structure 3 is flush with that of the base 2.

The upper surface of an assembly formed by laminating the authenticity proving optical structure 3 to the base 2 may be coated with a transparent protective layer 1a provided that the protective layer 1a does not obstruct observing the authenticity proving optical structure 3 or reading information from the authenticity proving optical structure 3.

The base 2 may be a sheet of a resin, such as a polyvinyl chloride resin, a polyester resin, a polycarbonate resin, a polyamide resin, a polyimide resin, a cellulose diacetate resin, a cellulose triacetate resin, a polystyrene resin, an acrylic resin, a polypropylene resin or a polyethylene resin, or a metal, such as aluminum or copper, a composite paper sheet produced by impregnating a paper sheet with a resin or latex, or a composite sheet.

When the base 2 is required to be heat-resistant, the base 2 may be a sheet of an amorphous polyester resin or a sheet of a blended resin prepared by blending an amorphous polyester resin and a polycarbonate resin.

Although dependent on quality of the base 2, usually, the thickness of the base 2 is in the range of about 10 μm to 5 mm. If the authenticating proof recording medium 1 has the function of a magnetic card, the base 2 must conform to ISO Standards and must be 0.76 mm in thickness. If the base 2 is formed of a polyvinyl chloride resin (hereinafter referred to as "PVC"), the base 2 is formed from a 0.76 mm thick four-layer laminate sheet formed by putting two 280 μm thick white PVC sheets together to obtain a core sheet, coating each of the opposite surfaces of the core sheet with a 100 μm thick transparent PVC sheet serving as a coating sheet, and laminating the white PVC sheets and the transparent PVC sheets by hot pressing.

If the base 2 is a four-layer laminated sheet, the authenticity proving optical structure 3 is attached to a part of the core sheet facing the coating sheet, a part of the coating sheet facing the core sheet or a part of the outer surface of the coating sheet.

An arrangement of minute optical unit areas 4 can be found in the authenticity proving optical structure 3 through the microscopic observation of the authenticity proving optical structure 3. In the authenticity proving optical structure 3 shown in FIG. 1, the minute optical unit areas 4 are square and are arranged in a matrix.

The size of the authenticity proving optical structure 3 is in the range of about several millimeters to about several centimeters. The authenticity proving optical structure 3 may have a size corresponding to the entire surface of the base 2.

Preferably the minute optical unit areas 4 of the authenticity proving optical structure 3 are formed in a small size to make the visual recognition of the minute optical unit areas 4 difficult. Preferably, the size of the minute optical unit areas 4 is 0.3 mm or below because the minute optical unit areas 4 will be easily visually recognized and may be easily analyzed if the size of the minute optical unit areas 4 is greater than 0.3 mm. The size signifies the length of the sides of the minute optical unit areas 4 if the minute optical unit areas 4 is square, the length of the long sides of the minute optical unit areas 4 if the minute optical unit areas 4 are rectangle, the length of the major axis of the minute optical unit areas 4 if the minute optical unit areas 4 are elliptic or the width of the widest part of the minute optical unit areas 4 if the minute optical unit areas 4 have some other shape.

Preferably, the size of the minute optical unit areas 4 is far smaller than the diameter of a laser beam that goes into the authenticity proving optical structure 3 because all the holograms formed in the minute optical unit areas 4, and all the diffraction gratings can be reproduced when the authenticity proving optical structure 3 is irradiated with the laser beam for hologram reproduction if the size of the minute optical unit areas 4 is far smaller than the diameter of the laser beam.

Each of the minute optical unit areas 4 may be formed in the smallest possible size provided that the minute optical unit area 4 can contain at least two minute areas. However, it is preferable that the size of the minute optical unit areas 4 is 10 μm or above in view of facility for mass production and observation.

Shown in enlarged views in FIG. 1 are the one minute optical unit area 4 surrounded by a circle, and the two adjacent minute optical unit areas 4 surrounded by a rectangle having rounded corners among the minute optical unit areas 4. Each of the minute optical unit areas 4, 4a and 4b shown in enlarged views consists of thirty-six square minute areas 5 arranged in a 6×6 matrix.

In the minute optical unit area 4 surrounded by a circle, the thirty-six minute areas 5 are divided into four groups each of the nine minute areas 5 by imaginary lines perpendicular to each other and passing the center of the minute optical unit area 4. The shaded minute areas A included in the upper left-hand group and the lower right-hand group have depths representing multiple-valued phase information about a Fourier transformation image obtained through the Fourier transformation of an original image A. The blank minute areas B included in the lower left-hand group and the upper right-hand group have depths representing multiple-valued phase information about a Fourier transformation image obtained through the Fourier transformation of an original image B. Preferably, as shown in FIG. 1, the minute optical unit areas 4 are arranged lengthwise and breadthwise in the same direction.

In the minute optical unit areas 4a and 4b surrounded by a rectangle, the shaded minute areas A included in the left-hand minute optical unit areas 4a have depths representing multiple-valued phase information about a Fourier transformation image obtained through the Fourier transformation of an original image A. The blank minute areas B included in the right-hand minute optical unit area 4b have depths representing multiple-valued phase information about a Fourier transformation image obtained through the Fourier transformation of an original image B. Preferably, as shown in FIG. 1, the minute optical unit areas 4a and 4b are arranged alternately lengthwise and breadthwise.

Figure 2:
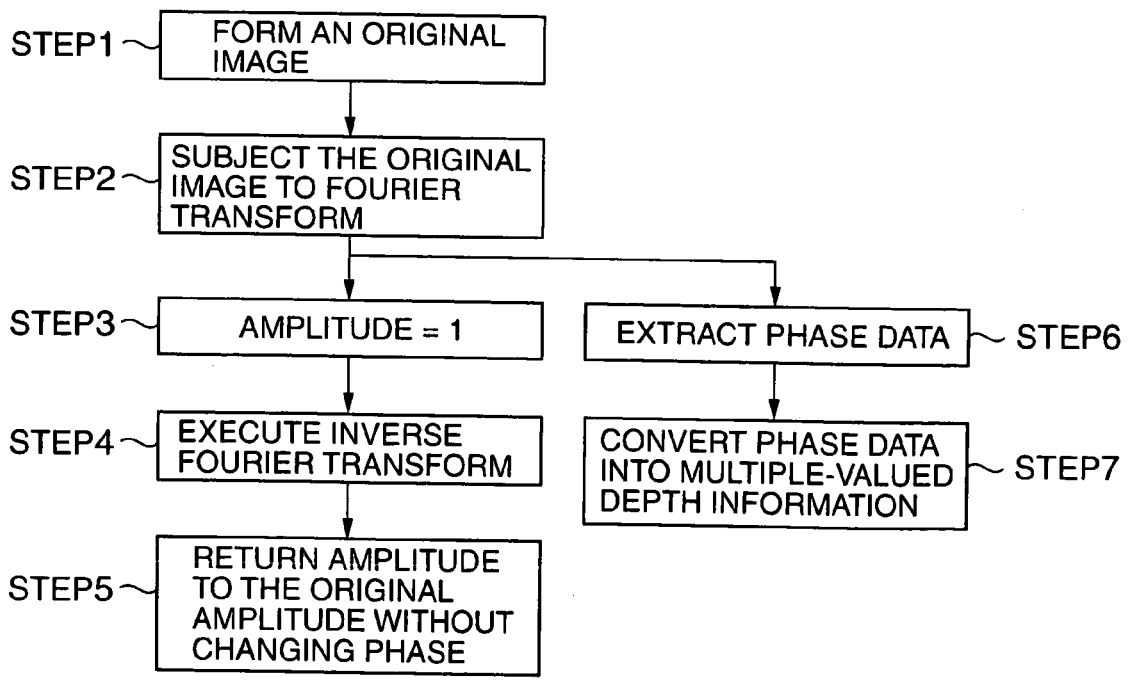
FIG. 2 is a flow chart of a procedure for obtaining multiple-valued depth information from an original image.

A procedure for recording information in depths in the minute areas A and B on the basis of the original images A and B will be described with reference to FIG. 2. As shown in FIG. 2, steps 1 to 7 of the procedure are executed for each of the original images to record the information in depths in the minute areas A and B.

Step 1: An optional original image is formed. The original image may be any one of letters, numeral, figures, symbols, pictures, animations and photographs.

Step 2: The original image is subjected to Fourier transformation on a computer to form a Fourier transformation image of the original image.

Step 3: Amplitude=1

Step 4: Inverse Fourier transformation is executed.

Step 5: Amplitude is returned to the original amplitude.

Step 6: Phase data is extracted after stopping.

Step 7: Phase data is converted into multiple-valued depth information about depths of a predetermined number of steps.

Precisely, the depth information thus obtained ought to be called "depth information obtained by multiple-valuing phase information about the Fourier transformation image of the original image". However, the depth information will be called "multiple-valued depth information based on the original image" herein.

Multiple-valuing of the phase data based on the original images A and B is binary coding, quad coding, octal coding or hexadecimal coding. The ideal diffraction efficiency of an octal coded grating is 95.0%, which is practically sufficiently high. Thus, it is preferable that multiple-valuing is binary coding, quad coding, or octal coding.

In the authenticating proof recording medium 1 shown in FIG. 1, the multiple-valued depth information based on the original images A and B is produced, the depth information is assigned to the minute areas A and B shown in FIG. 1. This operation is performed to the rest of the minute optical unit areas 4 of the authenticity proving optical structure 3.

The multi-valued depth information is assigned to the minute areas A and B of the minute optical unit area 4 by an electron-beam plotting machine or a grating plotting machine. A photosensitive resin film is exposed to light, the exposed photosensitive resin film is developed to form a cured photosensitive resin film having a surface with minute protrusions and depressions, or a substrate having a surface with minute protrusions and depressions is formed by etching.

Although the film or the substrate thus formed may be used as the authenticity proving optical structure 3, it is preferable to mass-produce authenticity proving optical structures 3 by using a mold having the desired minute protrusions and depressions formed by copying the film or the substrate.

The two kinds of pieces of depth information based on the different original images A and B are formed in the four groups of the minute areas A and B in each minute optical unit area 4, respectively, or in the minute areas A of the minute optical unit areas 4a and in the minute areas B of the minute optical unit areas 4b, respectively. The authenticity proving optical structure 3 is effective when the minute optical unit areas 4, 4a and 4b have at least two minute areas A and B. The authenticity proving optical structure 3 is effective when the two kinds of pieces of multiple-valued depth information based on the different original images A and B are distributed in the minute optical unit area 4 or the multiple-valued depth information based on the original image A is assigned to the minute optical unit area 4a and the multiple-valued depth information based on the original image B different from the original image A is assigned to the minute optical unit area 4b.

The number of the pieces of multiple-valued depth information based on original images may be optionally increased.

The use of at least two kinds of pieces of multiple-valued depth information based on different original images enables changing conditions for coherent light to be used for reproducing holograms, such as the angle of light beam to the irradiated surface. Thus, the analysis of the hologram is difficult. Since authenticity is not certified until the reproduced image can be entirely recognized, the ability of the authenticity proving optical structure 3 to certify authenticity, namely, reliability, is high.

The minute optical unit areas 4 may be arranged in any one of various shapes. The minute optical unit areas 4 may be arranged lengthwise and breadthwise in a matrix as shown in FIG. 3(a), may be arranged such that minute optical unit areas of the alternate rows may be shifted relative to those of the adjacent rows by half the pitch of the minute optical unit areas 4 as shown in FIG. 3(b) or by ⅓ of the pitch of the minute optical unit areas as shown in FIG. 3(c).

Figure 4:
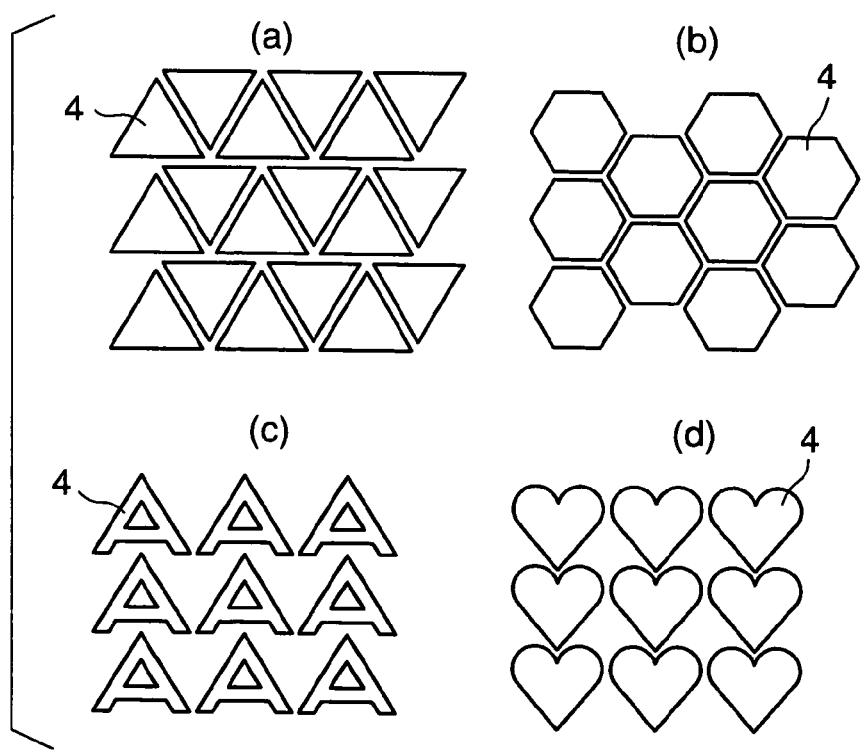
FIG. 4 is a diagrammatic view of assistance in explaining the shape of minute optical unit areas.

The minute optical unit areas 4 may have the shape of a polygon, such as a triangle (FIG. 4(a)), a square, a pentagon or a hexagon (FIG. 4(b)), a geometrical figure other than polygons, such as a circle or an ellipse, a letter or a numeral, such as the letter A (FIG. 4(c)), or an optional figure, a symbol or a figure, such as a heart (FIG. 4(d)).

Geometrical figures, such as polygons, circles and ellipses, are preferable because geometrical figures facilitate a procedure for assigning the multiple-valued depth information based on original images to the minute optical unit areas 4. Particularly, specific geometrical figures, such as triangles, squares and hexagons, can be easily densely arranged.

Letters, numerals, optional figures and symbols attract attention to their shapes when their shapes become clear, which may be advantageous in concealing the information stored in the minute optical unit areas 4. The shapes of the minute optical unit areas 4 may signify some information, which may be one of measures to prevent counterfeiting.

Figure 3:
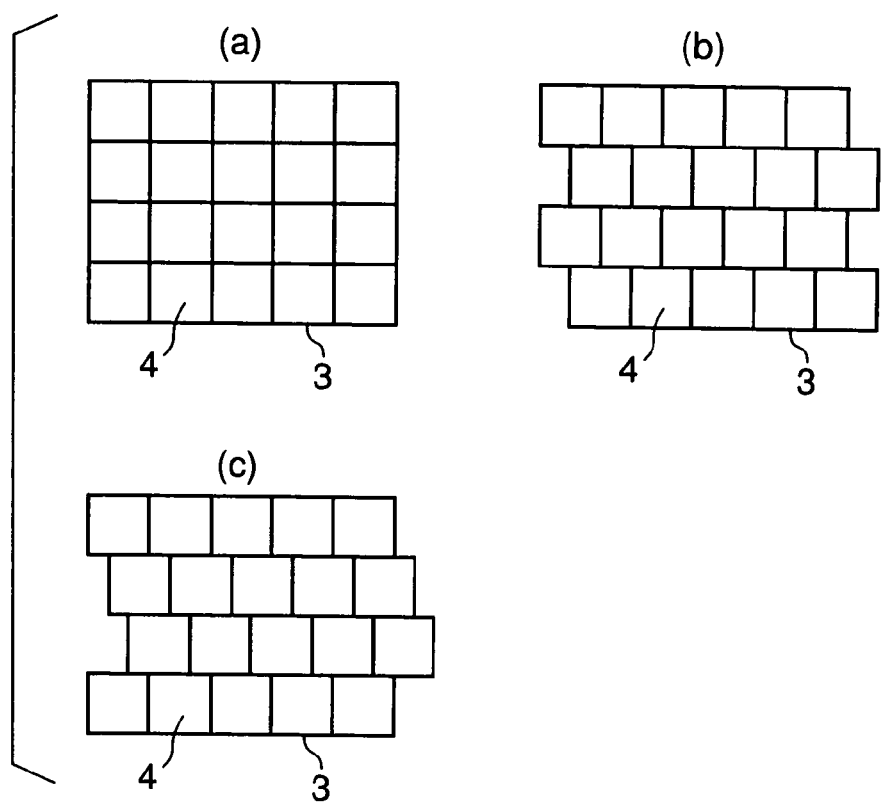
FIG. 3 is a diagrammatic view showing arrangements of minute optical unit areas in an authenticity proving optical structure.

The minute optical unit areas 4 may be arranged in various manners of arrangement other than those explained in connection with FIG. 3.

When the minute optical unit areas 4 are triangles as shown in FIG. 4(a), the triangular minute optical unit areas 4 in alternate rows are inverted in a manner where triangular minute optical unit areas 4 in the first row are arranged with one side of each of the triangular minute optical unit areas facing upward, triangular minute optical unit areas 4 in the second row are arranged between the triangular minute optical unit areas in the first row, triangular minute optical unit areas 4 in odd-numbered rows are arranged in the same as in the first row, and triangular minute optical unit areas 4 in even-numbered rows are arranged in the same as in the second row. As a result, the triangular minute optical unit areas 4 can be arranged densely.

When the minute optical unit areas 4 are hexagons as shown in FIG. 4(b), the hexagonal minute optical unit areas 4 are arranged in the shape of a honeycomb to arrange the hexagonal minute optical unit areas 4 densely. That is to say, in FIG. 4(b), the minute optical unit areas 4 in the first left vertical row are arranged with opposing sides of the adjacent minute optical unit areas being parallel to each other in a horizontal direction, and the optical unit areas 4 in the second vertical row are arranged so as to be shifted relative to those in the first vertical row by half the pitch of the minute optical unit areas 4.

Although it is difficult to arrange the minute optical unit areas 4 densely without forming gaps between the adjacent minute optical unit areas 4 when the minute optical unit areas 4 are the letters A as shown in FIG. 4(c) or hearts as shown in FIG. 4(d), the minute optical unit areas 4 do not need necessarily to be arranged densely without forming gaps because the minute optical unit areas 4 are very small and the gaps are difficult to recognize visually.

Minute optical unit areas having the shape of a polygon, such as a square, are preferable, because such minute optical unit areas can be densely arranged to form a hologram having high reproducibility. Thus, minute optical unit areas capable of occupying each of repetitive unit areas at a higher ratio are more preferable among those having shapes other than polygonal shapes.

The shape of the authenticity proving optical structure 3 does not need to be limited to a rectangle as shown in FIG. 1. The authenticity proving optical structure 3 may have any suitable shape, like one of the foregoing shapes for the minute optical unit areas 4. The authenticity proving optical structure 3 may be formed in a shape having parts in which the minute optical unit areas 4 are arranged and blank parts. For example, the authenticity proving optical structure 3 may be formed in a square having some parts in which the minute optical unit areas 4 are arranged in the shape of a letter, and blank parts.

It is preferable from the viewpoint of industrial manufacture that authenticity proving optical structures 3 to be mounted on the base 2 are mass-produced by using a mold made by copying the original film having the surface provided with the protrusions and depressions.

The mold may be a replica formed by copying the shape of the surface of an original on the surface of a photosensitive resin film, or a replica formed by repeatedly plating the surface of a substrate provided with protrusions and depressions formed by etching in the shape of the original protrusions and depressions.

Preferably, the authenticity proving optical structure is mass-produced by a method in which a liquid ionizing radiation-curable resin (usually, UV-curable resin) is spread over a transparent film in an ionizing radiation-curable resin film, the molding surface of a copying mold provided with minute protrusions and depressions is pressed against the ionizing radiation-curable resin film, and the ionizing radiation-curable resin film is irradiated with ionizing radiation while the copying mold is pressed against the ionizing radiation-curable resin film to form a cured resin film having a surface with the minute protrusions and depressions by curing the ionizing radiation-curable resin film. Due to this method, a laminated structure consisting of the transparent resin film, and the cured resin film formed on the transparent resin film and having a surface with the minute protrusions and depressions, is formed.

Usually, a thin reflecting layer of a metal such as aluminum or a material differing from the material forming the cured resin film in refracting index is formed on the surface of the cured resin film with the minute protrusions and depressions.

The laminated structure formed by laminating the transparent film, the cured resin film with the minute protrusions and depressions, and the reflecting layer in that order is laminated to the base 2 by bonding the transparent film or the reflecting film to the base 2 with an adhesive, such as a heat-sensitive adhesive to obtain the authenticating proof recording medium 1 having the base 2 and the authenticity proving optical structure 3.

The cured resin film with the minute protrusions and depressions may be formed on the transparent film so as to be separable from the latter, the base 2 may be bonded to the reflecting film with an adhesive, such as a heat-sensitive adhesive, and then the transparent film may be removed from the cured resin film. Thus, the authenticity proving optical structure 3 may be attached to the base 2 by a transfer method.

Figure 5:
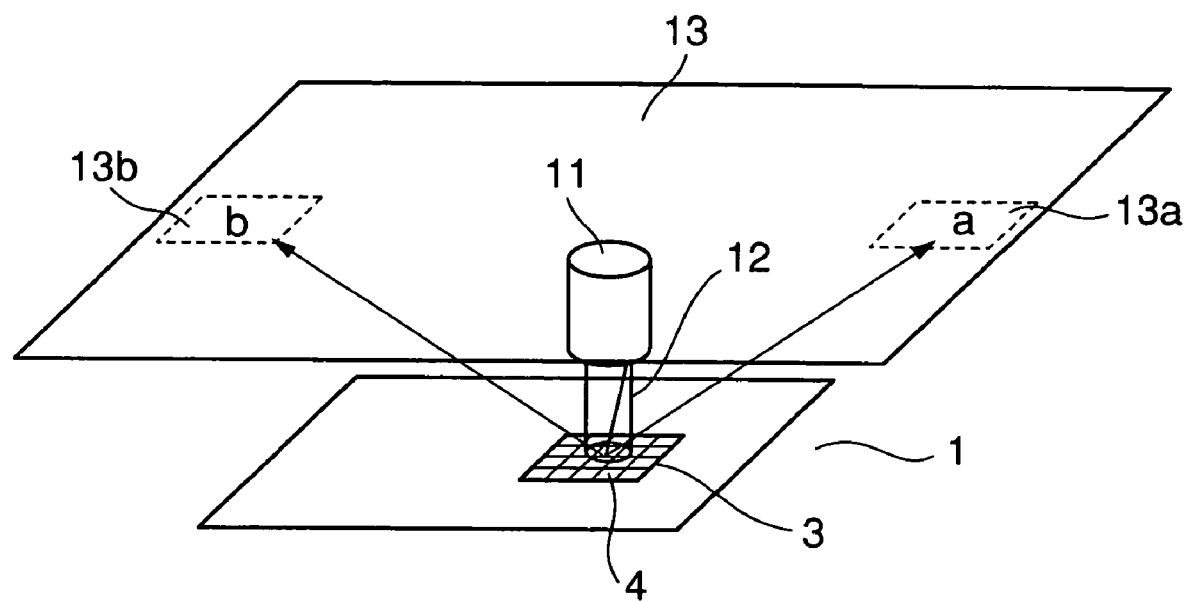
FIG. 5 is a view of assistance in explaining an authenticity certifying method.

An authenticity certifying method will be explained in connection with the card shown in FIG. 1. Referring to FIG. 5, the authenticity proving optical structure 3 of the authenticating proof recording medium 1 is irradiated with a laser beam 12, i.e., a beam of coherent light having a predetermined wavelength, emitted by a laser 11. Although the diameter of the laser beam 12 may be smaller than the size of the minute optical unit areas 4 of the authenticity proving optical structure 3, it is preferable that the diameter of the laser beam 12 is greater than the size of the minute areas A and B of the minute optical unit areas 4.

Thus, holograms a and b represented by multiple-valued depth information based on the original images A and B are reproduced. Although the minute areas A an B recording the multiple-valued depth information based on the original images A and B look white under white light, it is possible that the minute areas A and B can be prevented from being detected and located, whereas the hologram formed in a large area by the prior art can be clearly known and can be easily detected and located.

The holograms a and b will be referred to as reproduced images.

The reproduced images are compared with reference images prepared in advance to see if the reproduced images are identical with the reference images. Thus, the authenticity of the card, namely, the authenticating proof recording medium 1, can be confirmed.

The holograms a and b can be seen in a right-hand area 13a and a left-hand area 13b, respectively, of an imaginary plane 13. An authenticity confirming device is used to examine the authenticating proof recording medium 1. The authenticity confirming device has a box formed such that a surface of its top plate coincides with the plane 13, and containing the laser 11 and a table, not shown, for supporting the authenticating prove recording medium 1 thereon. Rear projection screens are formed in areas 13a and 13b of the surface coinciding with the plate 13 of the top plate of the authenticity confirming device, respectively. The reproduced images are examined by using the authenticity confirming device. Thus, the authenticity of the authenticating proof recording medium 1 can be easily confirmed.

Basically, the authenticating proof recording medium 1 of the present invention has the foregoing construction. The authenticating proof recording medium 1 may includes the following elements.

When the authenticating proof recording medium 1 is a card as shown in FIG. 1, the authenticating proof recording medium 1 is provided with a magnetic recording layer in most cases. The magnetic recording layer includes stripes of widths in the range of 5 to 10 mm formed directly on the surface or within the base 2 with a magnetic coating. Stripes obtained by cutting a plastic sheet coated with a magnetic coating may be attached to the surface of the base 2. A magnetic recording layer formed on a transfer sheet held on a temporary base sheet may be transferred to the base 2 by transfer printing.

Most general recording mediums including cards are provided with a magnetic recording layer. The magnetic recording layer may be replaced with a suitable means equivalent thereto in function, such as an optical recording layer or an IC module. Preferably, the recording mediums are provided with a general-purpose magnetic recording layer in addition to an optical recording layer or an IC module.

The authenticating proof recording medium 1 may be provided with an ordinary hologram (or a diffraction grating) in addition to the authenticity proving optical structure 3 to divert concern from the authenticity proving optical structure 3.

Suitable letters may be printed on the authenticity proving optical structure 3 of the present invention. Supposing that the authenticating proof recording medium 1 is a card, letters are printed to indicate issuer, name of card, serial number, term of validity, holder's name and/or directions. Some of those pieces of information, for example, serial number, term of validity and holder's name may be embossed on the card.

The base 2 may be colored or provided with a pattern to provide the authenticating proof recording medium 1 with an aesthetic effect. Usually, the base 2 is colored or provided with a pattern by printing.

The authenticating proof recording medium 1 of the present invention is not limited to a card, and can be formed by using any suitable article as the base 2, and laminating the authenticity proving optical structure 3 to the article.

There are articles having information and serving as the authenticating proof recording medium 1, or not having any information and provided with the authenticity proving optical structure 3 representing information.

The authenticating proof recording medium 1 of the present invention may be a means for identifying the holder, such as a bank card, a credit card or an identification card. The authenticating proof recording medium 1 does not need necessarily to be a card, but may be an admission ticket for an examination, a passport or the like.

The authenticating proof recording medium 1 may be a banknote, a gift certificate, a stock certificate, a security, a bankbook, a train ticket, an airline ticket, a prepaid telephone card or a prepaid traffic ticket. When the authenticating proof recording medium 1 is used for such a purpose, an amount of money, issuer, serial number and/or directions are recorded in the authenticating proof recording medium 1.

The authenticating proof recording medium 1 of the present invention may be any one of suitable articles provided with the authenticity proving optical structure 3 storing information.

For example, the suitable articles may be world-famous, big-name brand, high-class commodities including high-grade watches, precious metals and jewelry, and caskets and cases for containing such commodities. Those expensive high-class commodities are liable to be targets of counterfeiting. Tags attached to commodities can be used as the base 2 of the authenticating proof recording medium 1.

Recording mediums storing music software, video software, computer software and game software and cases containing those pieces of software can be used as the base 2. The authenticity proving optical structure 3 may be attached to the base 2. Although each of the pieces of software is not necessarily expensive, there is the possibility that selling agencies handling those pieces of software would suffer a serious loss, if illegal copies of those pieces of software are sold in large quantities on the market.

The authenticity of the authenticating proof recording medium 1 provided with the authenticity proving optical structure 3 can be proved, whether or not the authenticating proof recording medium 1 has information other than that represented by the authenticity proving optical structure 3. Thus, the authenticity of the base provided with the authenticity proving optical structure 3, namely, the authenticating proof recording medium 1, can be certified.

According to the present invention, the minute areas having depths representing multiple-valued phase information about Fourier transformation images obtained through the Fourier transformation of original images are arranged. Therefore the hologram cannot be easily visually detected, and the hologram cannot be reproduced until the minute areas are irradiated with the coherent light. Thus, the hologram has enhanced safety against counterfeiting. Since each of the minute optical unit areas has the plurality of minute areas having depths representing multiple-valued phase information about Fourier transformation images obtained through the Fourier transformation of different original images, the angle of coherent light beam for reproducing the hologram to the irradiated surface can be changed to make the analysis of the hologram difficult. Since authenticity is not certified until the images reproduced from the minute areas of different types having depths representing multiple-valued phase information about Fourier transformation images obtained through the Fourier transformation of the original images can be entirely recognized, the authenticity proving optical structure is capable of certify authenticity with high reliability.

The present invention determines the size of the minute optical unit areas of the authenticity proving optical structure so that the visual recognition of the minute optical unit areas is difficult. Thus, the authenticity proving optical structure is scarcely subject to being analyzed.

The minute optical unit areas having a polygonal shape facilitate a procedure for assigning the depth information representing multiple-valued phase information about a Fourier transformation image obtained through the Fourier transformation of an original image to the minute optical unit areas. The triangular, square or hexagonal minute optical unit areas of the authenticity proving optical structure can be easily densely arranged.

The authenticity proving optical structure is provided with the minute optical unit areas having a shape effective in concealing the information stored in the minute optical unit areas.

The present invention provides the authenticating proof recording medium having the foregoing effects.

The present invention provides the authenticity certifying method capable of certifying authenticity by using the images reproduced from the authenticity proving optical structure.

The invention claimed is:

1. An authenticity proving optical structure comprising:
a plurality of minute optical unit areas, wherein each of the minute optical unit areas has a plurality of minute areas having depths representing multiple-valued phase information including one of a quad coding, an octal coding and a hexadecimal coding, wherein the coding is about a Fourier transformation image obtained through the Fourier transformation of different original images so that each of the plurality of minute areas has a plurality of depths in accordance with one of the quad coding, the octal coding and the hexadecimal coding, wherein
the plurality of minute areas include minute protrusions and minute depressions formed on a substrate or a film, and when the minute areas having depths representing multiple-valued phase information about a Fourier transformation image obtained through the Fourier transformation of different original images are irradiated with a coherent light, from a coherent light source, a hologram image is produced having the multiple-valued phase information based on the different original images.

2. The authenticity proving optical structure according to claim 1, wherein the minute optical unit areas have a length of 0.3 mm or below.

3. The authenticity proving optical structure according to claim 1, wherein the minute optical unit areas have a polygonal shape.

4. The authenticity proving optical structure according to claim 1, wherein the minute optical unit areas have the shape of a letter, a numeral, a figure or a symbol.

5. An authenticating proof non-transitory recording medium comprising:
   a base; and
   an optical structure formed on the base, wherein the optical structure comprises a plurality of minute optical unit areas, and each of the minute optical unit areas has a plurality of minute areas having depths representing multiple-valued phase information including one of a quad coding, an octal coding and a hexadecimal coding, wherein the coding is about a Fourier transformation image obtained through the Fourier transformation of different original images so that each of the plurality of minute areas has a plurality of depths in accordance with one of the quad coding, the octal coding and the hexadecimal coding, and
   the plurality of minute areas include minute protrusions and minute depressions formed on a substrate or a film, and when the minute areas having depths representing multiple-valued phase information about a Fourier transformation image obtained through the Fourier transformation of different original images are irradiated with a coherent light, from a coherent light source, a hologram image is produced having the multiple-valued phase information based on the different original images.

6. An authenticity certifying method using an authenticity proving optical structure comprising:
   a plurality of minute optical unit areas, each having a plurality of minute areas having depths representing phase information including one of a quad coding, an octal coding and a hexadecimal coding, wherein the coding is about a Fourier transformation image obtained through the Fourier transformation of different original images so that each of the plurality of minute areas has a plurality of depths in accordance with one of the quad coding, the octal coding and the hexadecimal coding, wherein
   the plurality of minute areas include minute protrusions and minute depressions formed on a substrate or a film, and when the minute areas having depths representing multiple-valued phase information about a Fourier transformation image obtained through the Fourier transformation of different original images are irradiated with a coherent light, from a coherent light source, a hologram image is produced having the multiple-valued phase information based on the different original images, and wherein the authenticity certifying method includes the steps of:
   preparing a reference image;
   irradiating the authenticity proving optical structure with the coherent light from the coherent light source; and
   deciding whether or not an image reproduced from the authenticity proving optical structure is identical to the reference image.

* * * * *